INVENTOR
Erik Fuglsang-Madsen
BY Spencer & Kaye
ATTORNEYS.

Nov. 26, 1968  E. FUGLSANG-MADSEN  3,412,432
INJECTION MOLDING MACHINES

Filed June 10, 1965  3 Sheets-Sheet 3

INVENTOR
Erik Fuglsang-Madsen
BY *Spencer & Kaye*
ATTORNEYS

United States Patent Office 3,412,432
Patented Nov. 26, 1968

3,412,432
INJECTION MOLDING MACHINES
Erik Fuglsang-Madsen, 2 Humlebakken,
Birkerod, Denmark
Filed June 10, 1965, Ser. No. 462,854
Claims priority, application Denmark, June 10, 1964,
2,902/64
6 Claims. (Cl. 18—30)

ABSTRACT OF THE DISCLOSURE

An injection molding machine for non-metallic compounds having a plurality of circularly movable injection nozzles, each communicating with a main cylinder, and a movable mold conveyor with a number of mold inlets. The mold conveyor is movable along a portion of a path common to the path of the injection nozzles. The machine is provided with mold supporting members, which support the molds while opposite the injection nozzles, and pressure means by which each injection nozzle can, under pressure, be brought into engagement with the mold inlet located opposite thereto to deliver a compound.

---

Figure 1:
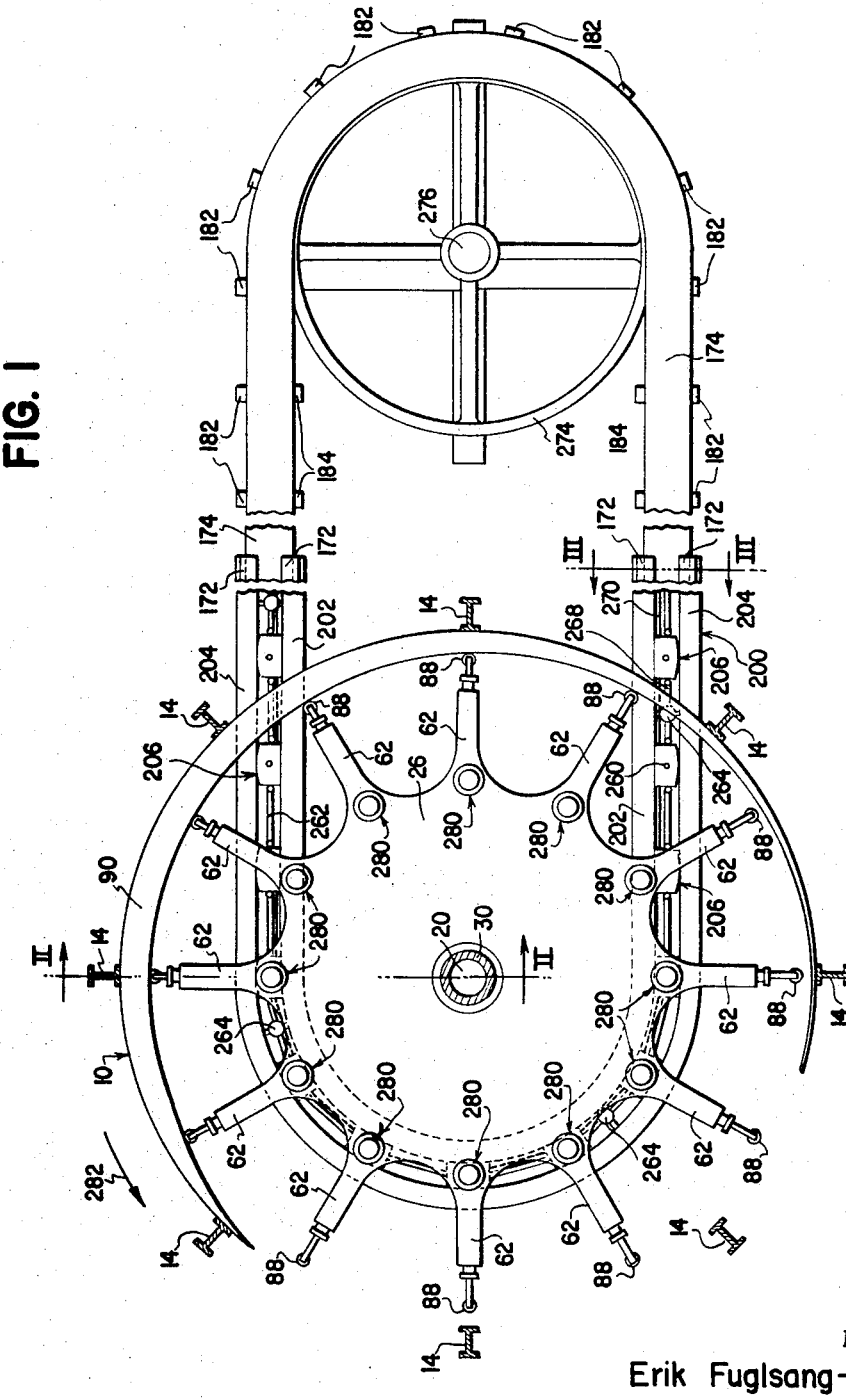

This invention relates to an injection molding machine for non-metallic compounds, e.g. plastic materials, having at least one injection nozzle, which is fed from a main cylinder with a power-driven piston, which main cylinder is again fed from a continuously operating pump.

The costs in connection with the molding of plastic articles depend partly upon the price of the plastic material which again is depending upon the weight of the article, partly upon the capacity of the molding machine used since the share of each single article in the interest and depreciation expenses of the machine, wages, accommodation rent etc. depends upon the capacity.

By mass production of plastic articles very often molding machines are used which in order to reduce the costs are provided with molds in which it is possible to mold a great number of articles at a time so that per shot it is possible to produce a number of articles which together have a weight corresponding to the maximal amount of plastic material, which the molding machine can deliver at each shot. Hitherto this has been found to be the most advantageous method even if it requires expensive molds which are extremely complicated both as regards the arrangement of the inlets and the dimensioning of the latter and as regards the cooling system of the mold.

An object of the invention is to provide an injection molding machine which is capable, while using extremely simple and consequently cheap molds, to produce articles of plastic material at a substantially greater capacity than has hitherto been the case.

Another object is to provide an injection molding machine in which simultaneously a number of molds are under filling although at different filling stages.

A further object is to provide an injection molding machine in which a number of molds are used and in which the cooling of the article molded in a mold takes place after the mold having been removed from the injection device.

A still further object is to provide an injection molding machine provided with a number of injection devices each comprising a main feed cylinder provided with a power driven piston and each comprising auxiliary means adapted to ensure a very quick filling of said main feed cylinder with fresh compound.

Still another object is to provide an injection molding machine provided with a number of injection devices co-operating with a greater number of molds interconnected to form an endless mold conveyor or mold band and in which at a time a number of molds are connected to injection devices for being filled with compound, although at different filling stages, simultaneously with cooling taking place in other molds, after the same having been filled with componud, and still at least one mold being under separation of the mold parts for removal of the article just molded and hardened therein.

Still a further object is to provide an injection molding machine provided with a number of molds arranged as an endless mold conveyor or mold band and adapted simultaneously at a time to comprise some molds for molding a first kind of articles and molds for molding of at least one further kind of articles.

With these ends in view the invention embodies an injecting molding machine comprising a plurality of circularly movable injection nozzles, each communicating with a main cylinder, and a mold conveyor comprising a number of molds each having an inlet, which mold conveyor is movable along a path partly following the path of the injection nozzles, whereas the machine is provided with supporting members for the support of the molds while the latter are located opposite the nozzles, and pressure members by means of which each nozzle can under pressure be brought into engagement with the inlet of the mold located opposite the nozzle.

In such a machine which is preferably adapted to be used in connection with molds, in each of which a single article or quite few articles are molded at a time, injection will take place simultaneously in a number of molds at a time, and since it is fairly small amounts of plastic materials that are to be injected into each mold, the injection of plastic material into each mold will require essentially shorter time than has been the case in the hitherto known injection molding machines working with molds adapted for the molding of several articles at a time. Moreover, in the new machine, the cooling of the molded articles will take place while the molds are moving on the part of the mold conveyor located outside the part thereof coinciding with the path of the injection nozzles so that the individual nozzle need not as in the known injection molding machines be inactive during the cooling of the article or articles just molded by means of the nozzle.

By way of example can be mentioned that articles having a weight of 2–3 g. and with a varying thickness of material require, provided a too heavy shrinkage of the molded articles should be avoided and the material used for the articles shall obtain the necessary physical properties, a cooling time of about 12 seconds. If, in a molding machine of known type, a mold adapted to for example 24 articles is used, further an injection time of about 1 second will be required on account of the necessary long transverse inlets in the mold, and moreover about 2 seconds are required for the ejection of the molded articles and the return of the mold to its molding position. Consequently, a molding machine working with such a mold has at most a capacity of 4 times 24 equal to 96 articles per minute.

In a machine according to the invention provided with 12 injection nozzles rotating with a speed corresponding to one revolution per second, it is possible, true enough when using 180 molds each designed for the molding of 2 articles, to mold 12 times 2 times 60 equal to 1,440 articles per minute and still obtain the same cooling time for each article.

True enough, it is necessary to use a very great number of molds, but each mold will both as regards construction of cooling channels and as regards the construction of the inlets be extremely simple and consequently per article essentially cheaper than a mold adapted to 24 articles. Moreover, the inlets in such a small mold do not require any balancing, whereas the balancing of the inlets in molds adapted to a greater number of articles are complicated, and therefore in a machine according to the invention it is possible without difficulties being involved to use molds provided with exchangeable matrix and patrix parts constructed for articles of widely different shapes and greatly different weights so that the greater part of the mold expenses is a one-time expense.

A single machine according to the invention consequently replaces about 14 known machines provided with molds each adapted for molding of 24 articles, but the purchase price including molds will be a fraction of the purchase price for these machines.

A further advantage can be obtained if the machine is provided with a number of pumps individually connected to one or more main cylinders in which manner it becomes possible with the same machine to mold articles, also different articles, of different material, e.g. of different colours.

On account of the great number of shots per minute each injection nozzle with associated main cylinder must produce, the time for the filling of the main cylinder between two injections is very short, and even if feeding pumps are used which can feed the plastic material under high pressure, it will often be difficult to ensure a complete filling of each main cylinder between two shots. Therefore, it may be advantageous to have inserted between each main cylinder and the associated pump an auxiliary cylinder with power-driven piston. During each shot, that is while the piston of the main cylinder moves from its top position to its bottom position, the auxiliary cylinder may from the feeding pump be filled with a plastic material which in the intermediate period between two shots can be fed to the main cylinder under much higher pressure and thus at an essentially greater speed than it is possible to obtain by feeding from a feeding pump. The stroke volume of said auxiliary cylinder ought to be of the same magnitude as that of the main cylinder so that the auxiliary cylinder alone can ensure the filling of the main cylinder.

On account of the great pressures produced by means of the auxiliary cylinder it may furthermore be advantageous that a non-return valve is inserted in the connecting channel between the pump and the feeding channel thus avoiding an over-loading of the feeding pump.

Figure 2:
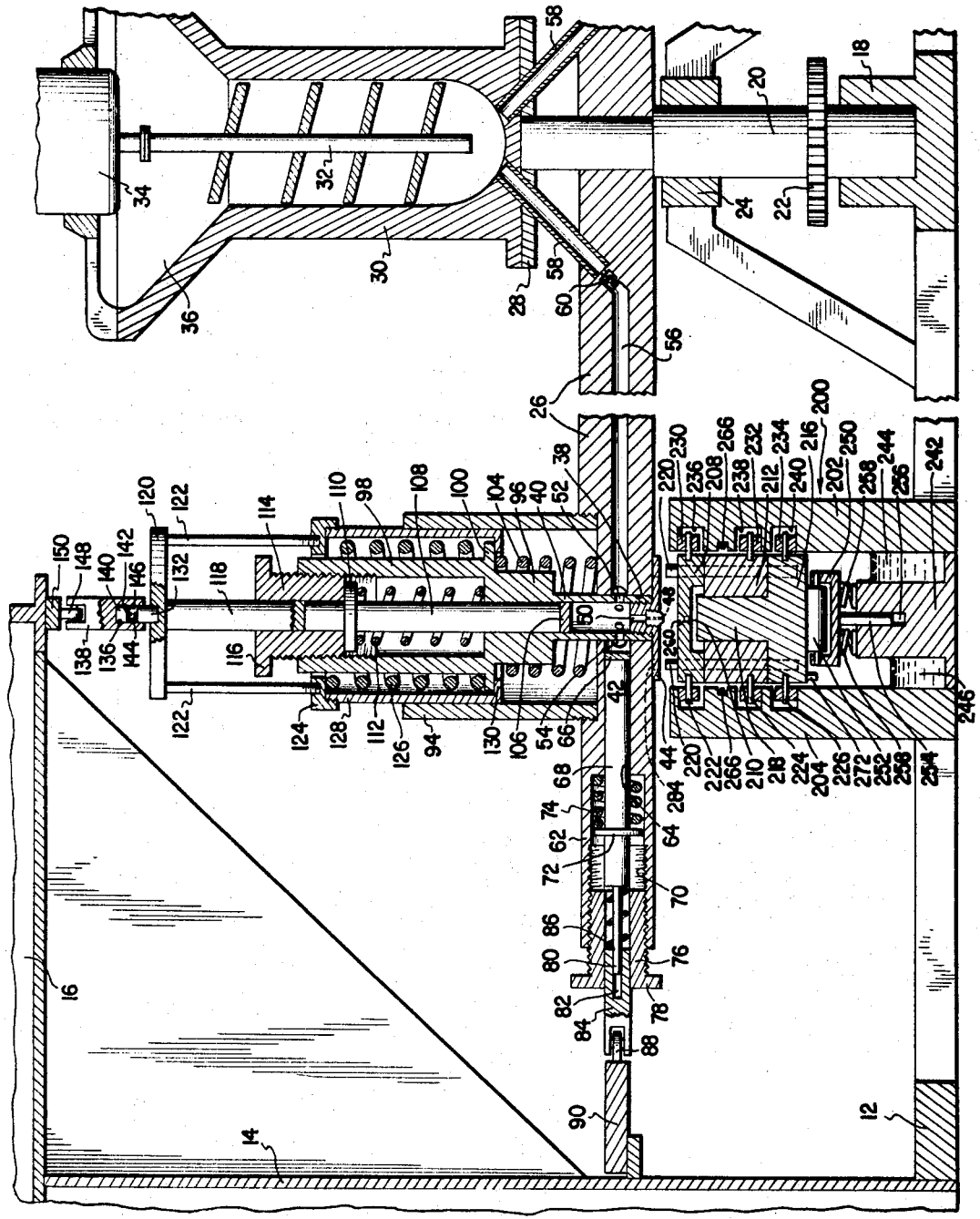
Figure 3:
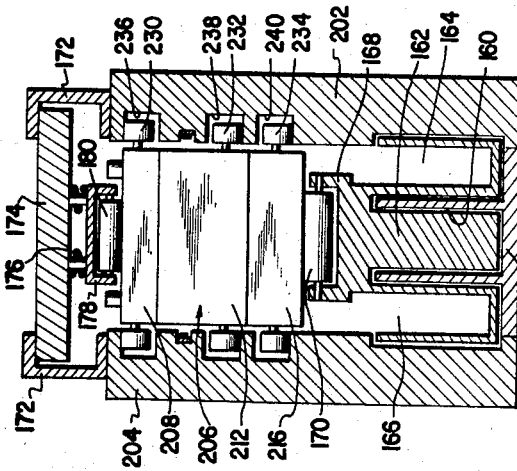
Figure 4:
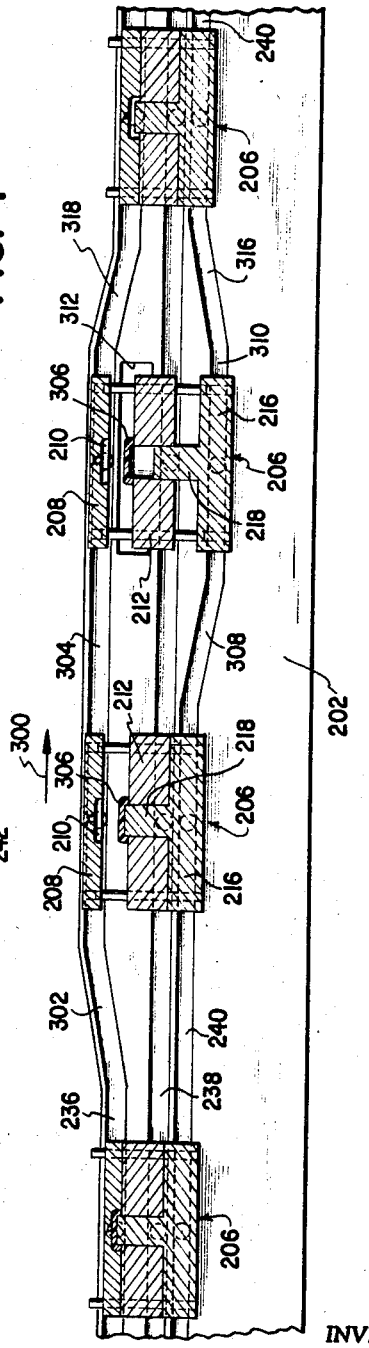

Other features and advantages of the invention will appear from the following description taken in connection with the attached drawings, wherein:

FIG. 1 is a diagrammatically plan view of an embodiment of the invention, the upper part of the machine being, however, omitted for the sake of clarity, FIG. 2 is on a larger scale a sectional view along the line II—II in FIG. 1, FIG. 3 is on a larger scale a diagrammatical sectional view along the line III—III in FIG. 1, and FIG. 4 is a detail showing an inside view of a guide arrangement for the molds with molds illustrated in mold positions produced by the guide arrangement.

The illustrated machine includes a molding unit, as a whole indicated by 10, comprising a frame consisting of a bottom frame 12, a number of uprights 14 and an upper frame 16. In the middle of the bottom frame 12 there is arranged an axial-radial bearing 18, preferably in a manner not further shown an axial-radial ball bearing, for a vertically positioned shaft 20 which immediately above the bearing 18 is provided with a gear or chain wheel 22 by which it can be driven from an electric motor (not shown) through a likewise not shown adjustable gear device. A little above the wheel 22 the shaft 20 is moreover supported in a radial bearing 24. Immediately above the latter the shaft 20 is provided with a fairly nozzle supporting member 26 which in the illustrated embodiment is constituted by a rather heavy solid plate, but it may also be composed by several thinner plates, or it may be formed by a number of arms, for example twelve arms.

At its upper end the shaft 20 is provided with a flange 28 to which, co-axial with the shaft, a screw pump 30, for example an extruder, is attached. The screw shaft 32 of the latter may be stationary or as shown driven by means of an electromotor 34, mounted on top of the pump 30, through an adjustable gear device (not shown). The upper part 36 of the pump 30 is formed as a feed hopper for plastic powder or another mass to be molded.

Along a circle concentric with the shaft 20 the table 26 is provided with twelve vertical bores 38 in each of which a main cylinder 40 is arranged displaceable in the vertical direction. The main cylinder is at the bottom closed by means of a stopper 42 provided with a side flange 44 located underneath the table 26. A self-closing nozzle 46 is inserted into the outer side of the stopper 42 and provided with a downwards extending conical nozzle head 48 communicating through a passage 50 in the stopper 42 with the interior of the main cylinder 40.

The wall of the main cylinder 40 is immediately above the upper side of the stopper 42 provided with a number of openings 52 providing, when the flange 44 abuts against the lower side of the table 26, communication between the interior of the cylinder 40 and a feed channel 54, which surrounding the cylinder 40 is formed in the plate 26. From said feed channel 54 a connecting passage 56 extends radially inwards in direction of the shaft 20. This passage 56 extends at a relative short distance from the shaft 20 obliquely upwards towards the upper face of the plate 26, and is by means of a pipe 58 connected to the pump 30 communicating with the interior of the pump at the pressure end thereof. In the obliquely upwardly extending part of the passage 56 a non-return valve 60 is arranged preventing a mass flow through the connecting channel 56 in direction towards the pump 30.

Opposite each main cylinder 40 the plate 26 is provided with an outer radial extension 62, see also FIG. 1, provided with a bore 64 serving as an auxiliary cylinder, and opening in the bore 38 opposite the feed channel 54.

In the auxiliary cylinder 64 there is displaceably arranged a piston 66 mounted on a piston rod 68 having approximately the same diameter as the piston 66. Outside the bore 64, the extension 62 is provided with a bore 70 extending inwardly from the end of the extension 62 and having a diameter greater than the diameter of the bore 64. The piston rod 68 is provided with a flange 72 located in said bore 70, between which flange and the bottom of the bore 70 a pressure spring 74 is inserted adapted to press the piston rod 68 and thereby the piston 65 outwards. A bush 76, screwed into the outer end of the bore 70 has an end flange 78 serving as adjusting member. The inner end of said bush 76 constitutes a stop for the piston rod flange 72 and thus limitates the outward movement of the piston rod. The length of the stroke of the piston 66 can be adjusted by the bush 76 being screwed more or less into the bore 70.

The piston rod 68 is at its extreme and provided with a comparatively long pin 80 engaging into a corresponding bore 82 in a piston rod extension 84. Between the latter and the piston rod 68 itself there is inserted a safety arrangement, in the embodiment shown constituted by a pressure spring 86, which is so powerful that it does not yield until the resistance against the pressing in of the piston 77 essentially exceeds the resistance normally arising during the working of the machine.

The piston rod extension 84 is at its outer end provided with a roller 88 engaging a curved guide 90, see also FIG. 1, which is secured to the uprights 14.

The upper surface of the plate 26 is for each bore 38 provided with a recess 92 concentric with the bore, in which recess 92 a supporting cylinder 94 is secured. At a distance above the bottom of the recess 92 the main cylinder 40 has a thickened part 96 which at its upper end continues into an upper cylinder 98 the inner diameter of which is greater than the inner diameter of the main cylinder 40. At its lower end the upper cylinder 98 has a side flange 100. Between the lower side of the latter and the bottom of the recess 92 a pressure spring 104 is inserted, hereinafter called the cylinder spring, which spring presses the main cylinder 40 towards its uppermost position.

In the main cylinder 40 a piston 106 is arranged mounted on the lower end of a piston rod 108 having approximately the same diameter as the piston 106. The piston rod 108 is at its upper end provided with a flange 110 between which and the cylinder flange 98 a pressure spring 112 is inserted pressing the flange 110 into engagement with the lower side of an adjusting bush 114 screwed into the upper end of the upper cylinder 98. The adjusting bush 114 is at its upper end provided with a flange 116 serving as an adjusting handle. The piston stroke of the piston 106 may be adjusted by the bush 114 being screwed more or less into the cylinder 98.

A piston rod 118 displaceably arranged in the bush 114 is at its upper end provided with a side flange 120 from which a number of pressure rods 122 extends downwards. Said pressure rods 122 are at their lower end secured to a ring 124 displaceably mounted around the upper cylinder 98. Between the ring 124 and the cylinder flange 100 a pressure spring 126, hereinafter called the transfer spring, is inserted, which spring has a greater strength than the cylinder spring 104. The ring 124 is secured to the upper end of a jacket 128 enclosing the spring 126 and guided by the supporting cylinder 94. The jacket 128 is at its lower end provided with a bent-in flange 130 adapted to engage the lower side of the cylinder flange 100. A stud 132 secured to the upper side of the piston rod flange 120 engages a bore 136 in the lower end of a piston rod extension 138. Between the bottom of the bore 136 and the stud 132 there is inserted a hydraulic, mechanical or electrical overload safety device. In the embodiment shown this device comprises an electric switch 140 arranged at the bottom of the bore 136 and having a control pin 142 disposed opposite a push pin 144 on the upper end of the stud 132. Between the stud 132 and the switch 140 a spring member 146 is inserted having such a strength that it does not yield until after extraordinarily great influences, in which case the push pin 144 will contact the control pin 142 and close the switch 140 which is connected to a relay by which the driving motor for the shaft 20 can be interrupted.

The piston rod extension 138 is at its upper end provided with a roller 148 adapted to engage a cam guide 150 which concentrically with the shaft 20 is arranged in the upper frame 16 of the machine.

Below the plate 26 the machine is provided with a mold guide, as a whole indicated by 200, which, as appears from FIG. 1, is in top view U-shaped with a semi-circular end concentric with the shaft 20 and having its centre-line extending along a semi-circular arc having the same radius as the circular path along which the nozzle heads 48 are moving. The mold guide has two side walls 202 and 204, between which molds 206 can be displaced, which molds are interconnected to form a mold conveyor. Each mold 206 comprises an upper matrix part 208 with at least one mold cavity 210 on the lower side, an intermediate part 212 and a lower part 216 provided on its upper side with a core 218 for each mold cavity in the matrix part 208, which core 218 through the intermediate part 212 extends into the mold cavity 210. The intermediate part 212 is provided with preferably four guide pins 220 extending upwards into corresponding holes in the matrix part 208 and downwards through corresponding holes in the lower mold part 216. The upper ends of the guide pins 220 project beyond the upper side of the matrix part 208.

At the centre plane at right angles to the longitudinal centre line of the mold guide 200 each mold part 208, 212, and 216 is at either side provided with a guide pin 222, 224 and 226 respectively, on which guide rollers 230, 232 and 234 respectively are mounted. Each guide roller engages a corresponding groove 236, 238 and 240 respectively in the two side walls 202 and 204.

Centrally between the two side walls 202 and 204 of the mold guide 200 there is a substantially lower intermediate wall 242, between which and the side walls 202 and 204 liquid grooves 244 and 246 are provided for receiving a cooling agent. Along the semi-circular part of the mold guide 200 above the intermediate wall 242 a supporting frame 250 having an U-shaped cross-section, is arranged, which frame 250, if desired, may be divided into sections. In the frame 250 a number of conical supporting rollers 252 are arranged on which the lower part 216 of the molds 206 can rest. The supporting frame 250 is provided with a number of downwardly extending pins 254 engaging corresponding holes 256 in the intermediate wall so that the supporting frame 250 is displaceable relative to the same. Between the intermediate wall 242 and the supporting frame 250 pressure springs 258 are inserted.

The molds 206 are interconnected by means of connecting links 262, see FIG. 1, in such a manner that the distance between the inlets 260 of two consecutive molds 206 present on the semi-circular part of the mold guide 200 is exactly equal to the distance between two consecutive nozzle heads 48. The connecting links 262 are connected to the intermediate parts 212 of the molds.

Some of the connecting links 262 which are evenly distributed along the mold band conveyor serve as supporting members for cooling agent pumps 264. In the embodiment shown each pump is thought provided with an electromotor which is fed through current rails 266 located in the side walls 202 and 204. The pumps may also be driven by gear wheels engaging a rack substituting one of the rails 266. The suction pipe of each of the feeding pumps 264 extends in a manner not further shown down into the liquid groove 244 so that it can suck cooling agent from said groove. The pressure pipe of the pump is by means of a flexible pipe 268 connected to a through inlet passage in one or both of the adjacent molds 206, and the opposite end of said inlet passage is by means of a flexible liquid pipe 270 connected to the inlet passage of the next mold and in this manner the cooling agent inlet passages of two or more molds are connected in series. In FIG. 1 is indicated a liquid outlet 272 from the illustrated mold 206 which outlet opens above the liquid groove 246.

The mold conveyor formed by the molds 206 is at a distance from the molding unit 10 passed round a rotatably mounted guide wheel 274 having the same outer diameter as the outer diameter of the circular shaped part of the inner wall 202 of the mold guide 200. The circumferential surface of the wheel 274 is provided with grooves corresponding to the grooves 236, 238 and 240. The shaft 276 of the wheel 274 is mounted for rotation in a frame not further shown which in a manner likewise not further shown is displaceable towards and away from the shaft 20 so that the number of molds 206 in the mold conveyor may be changed.

The mold guide 200 ends at a distance from the molding unit 10 slightly greater than the length of the distance through which the frame of the wheel 274 can be displaced. The outermost sections of the mold guide 200 at either side of the machine have for a length corresponding to said distance a cross section as the one shown in FIG. 3. In this section the intermediate wall 242 is provided with a relatively wide U-shaped central frame 160 in which is displaceably mounted a T-shaped beam 162 secured in the frame of the wheel 274 and extending round the half of the wheel 274 opposite the molding unit 10 so that the two ends of the beam 162 engage the two ends of the mold guide 200. The beam 162 has at either side downwardly extending upwardly open grooves 164 and 166 extending down into the grooves 244 an 246 which at this section of the mold guide 200 are wider than at the section thereof which is inside the molding unit 10, and so that the width of the grooves 164 and 166 is the same as the width of the grooves 244 and 246 in the section of the mold guide that extends into the molding unit 10.

The beam 162 is along its upper end provided with roller guides 168 for a number of rollers 170 evenly distributed along the length of the beam 162 and having such a height that they support the lower part 216 of the molds 206, when the wheels 234 of the latter rest on the lower wall of the grooves 240.

At each end of section the mold guide 200 there is on the upper part of the side walls 202 and 204 secured U-irons 172 forming guides for longitudinally displaceable guide rail 174. The latter is likewise connected to the frame of the wheel 274 and extend above the beam 162 parallel to the latter. The guide rail 174 carries on its lower side vertically displaceable supporting frames 178 pressed downwards by means of pressure springs 176. In said frames 178 there are rotatably mounted guide rollers 180 which by means of the springs 176 are pressed downwards against the upper side of the upper side of the matrix parts 208 of the molds 206.

The beam 162 and the guide rail 174 are for the distance which does not get into engagement with the mold guide 200 interconnected by means of exterior supporting rods 182 and interior supporting rods 184 respectively, see FIG. 1. The supporting rods 182 are provided with a current rail corresponding to the current rail 266 in the outer wall 204 of the mold guide 200, and said current rail, not shown, may, when the wheel 274 is set at the correct distance from the molding unit 10, be connected to the current rail 266 in the outer wall 204 by means of a loose telescope-like extensible current rail. The wheel 274 is along its circumference provided with a circumferential current rail corresponding to the current rail 266 in the inner wall 202 of the mold guide 200, and the supporting rods 184 located outside the wheel 274 are provided with a similar current rail, the end of which nearest the wheel is constructed as a lamella contacting the current rail of the wheel. The current rail carried by the supporting rods 184 can be connected to a current rail 266 in the inner wall 202 of the mold guide by means of a telescope-like extensible current rail. The pumps 264 will consequently constantly be operated when the mold band conveyor formed by the molds 206 is moving. In case the pumps 264 are driven by a rack-and-gear wheel arrangement, detachable rack portions can be inserted between the rack of the mold guide 200 and the rack of the rack supported by the supporting rods 182 instead of the current rail.

FIG. 1 shows, of each nozzle unit consisting of the main cylinder 40 with the nozzle 46, 48, piston etc., only the flange 120, but each unit is as a whole indicated by 280. The cam guide 150 for the piston rod extension 138 of the main cylinder 40 is not illustrated in FIG. 1, but has the shape of a circular ring arranged concentric with the shaft 20. The section of the cam guide 150 extending from the nozzle unit 280 shown at the bottom of FIG. 1 in anti-clockwise direction to the nozzle unit 280 shown at the top of FIG. 1 has its lower side arranged in a constant distance from the plate 26, whereas the corresponding distance evenly decreases along the section of the cam guide extending from the nozzle unit 280 shown at the top of FIG. 1 in the anti-clockwise direction to a point halfway between the nozzle unit 280 shown at the bottom of FIG. 1 and the nozzle unit in FIG. 1 situated nearest the latter to the left hand side. From this point the said distance increases over a short section of the cam guide 150 to the above mentioned constant maximum distance.

The shape of the curved guide 90 for the piston rod extension 84 of the auxiliary cylinders 64 appears from FIG. 1.

The injection molding machine described operates in the manner appearing from the following, where, however, only the operation of the nozzle unit 280 shown at the top of FIG. 1 is described.

The said nozzle unit 280 assumes the position shown in FIG. 2 above a mold 206, and the parts assume the positions shown in FIG. 2. The plate 26 rotates in the direction shown by an arrow 282 in FIG. 1, and when the molding unit 280 in question moves away from the position shown in FIGS. 1 and 2 the piston rod extension 138 and consequently the piston rod 118 will evenly be displaced downwards by the cam guide 150. By this displacement the piston rod flange 120 will through the rods 122 push the ring 124 downwards, which movement will through the transfer spring 126 be imparted to the cylinder flange 100 and thus to the main cylinder 40 which under yielding of the cylinder springs 104 will be pressed downwards. By this operation the openings 52 will be pushed away from the feed channel 54 so that the molding material, e.g. plastic material, present in the main cylinder 40 will be confined. Simultaneously the flange 44 of the stopper 42 will be pushed downwards towards the mold 206, in which manner holes 284 formed in the flange 44 and exactly corresponding to the guide pins 220 will get into engagement with the latter and thus center the mold relative to the nozzle head 48. During the further downward movement of the main cylinder 40 the nozzle head 48 will contact the inlet 260 of the matrix part 208 and be pressed hard against the latter thus forming a tightly sealing connection. At the same time the lower mold part 216 will slide in onto the roller path 250, 252 and be supported from below so that the guide rollers 230, 232 and 234 are relieved. Owing to the engagement between the flange 44 and the guide pins 220 the mold 206 is carried along in the rotation of the plate 26 so that the mold conveyor is operated by this engagement. When the nozzle head 48 is in engagement with the inlet 260 the cylinder 40 cannot move further downward and consequently the transfer spring 126 will yield and make a further downward movement of the piston rod 118 feasible. The latter will in this manner get into engagement with the piston rod flange 110, and so the piston 106 will be pushed downwards and the mass present in the main cylinder 40 will be pressed into the mould cavity 210. The start of the filling operation is dependent upon the adjustable length of the stroke of the piston rod 108 but the filling operation will be terminated immediate after the moulding unit 280 in question has passed the position in FIG. 1 immediately to the left of the lower molding unit 280 whereafter the piston rod extension 138 will anew be moved upwards influenced first by the transfer spring 126 and, when the latter is prevented from further extension by the jacket 128, by the cylinder spring 104. At the same time the piston rod 108 and consequently the piston 106 will be pushed upwards by the spring 112, but substantially slower since velocity of the upward movement of the piston 106 depends on the velocity at which the main cylinder 40 is filled with a fresh molding mass as further described below.

When the stopper flange 44 has reached its uppermost position it is also free of the guide pins 220, and the mold 204 can thus move away from the nozzle unit in question.

At the time when the nozzle unit 280 in question was in the aforesaid start position shown in FIG. 2, the piston 66 of the auxiliary cylinder 64 was held in its innermost position by means of the curved guide 90. The screw pump or extruder 30 secures that constantly liquid plastic material under pressure fills the feed channel 54. Immediately after the nozzle unit 280 has left the said position, that is at the time when the main cylinder 40 has been pushed so far down that the connecting openings 52 have been moved away from the feed channel 54, the curved guide 90 is terminated, and the piston 66 is forced outwards by means of the spring 74. In this manner the auxiliary cylinder 64 is filled with the plastic material mass from the feed channel 54. This filling operation takes place gradually during the whole of the aforesaid molding period.

At the adjustment shown in FIG. 2 of the adjustment bush 76 for the piston 66 of the auxiliary cylinder 64 the roller 88 of the piston rod extension 84 will, when the nozzle unit in question is located in the position corresponding to the nozzle unit 280 shown at the bottom of FIG. 1, be positioned at a distance from the curved guide 90, but during the continued rotation of the plate 26 the roller 88 engages the curved guide 90 whereby the piston 66 will be pushed towards its bottom position with a fairly great pressure so that the mass mold in the auxiliary cylinder 66 through the feed channel 54 and the connecting openings 52 is pressed into the main cylinder 40 and fills the latter. The pressure thus exerted on the molding mass is greater than the pressure exerted by the pump or extruder 30 but is prevented by the non-return valve 60 from acting backwards on the same. However, during the time when the roller 88 is still not in engagement with the guide 90, the main cylinder 40 will be filled with molding mass by the pressure exerted by the pump 30. If in this way so much molding mass has reached into the cylinder 40 that the piston 66 cannot be pressed to the bottom, the safety spring 86 will yield and thus prevent damage. When the nozzle unit 280 in question has then reached the above mentioned start position, the cylinder 40 will without fail be filled with molding mass, and the aforesaid operation can be repeated.

While the molding mass is pressed into the mold 206, the three parts of the latter 208, 212 and 216 are kept pressed against one another with a comparatively great pressure owing to the mold being inserted between the nozzle head 48 pressed downwards by the transfer spring 126 and the roller path 250, 252 pressed upwards by the springs 258. Also after the molding operation the mold parts will remain pressed against one another but for this purpose a minor pressure is required than during the molding operation itself. Said pressing together of the mold parts is ensured by means of the mold guide 200 in consequence of the engagement of the rollers 230, 232 and 234 with the grooves 236, 238 and 240, and because the molds will follow the mold guide for a distance after they have left the molding unit.

When a mold 206 approaches the end of the branch of the mold guide 200 shown at the bottom of FIG. 1, the mold will, however, by the mold guide be directed in between the roller path formed by the beam 162 and the rollers 170 mounted therein and the downwardly pressed roller path 178, 180 carried by the guide rail 174, and the compression of the mold parts is now taken over by said two roller paths between which the molds are conducted to the wheel 274 around the rear half part of the latter and still moving between the roller paths in the direction backwards towards the molding unit 10, each mold being when approaching the latter again directed into the mold guide 200, this time into the branch thereof shown at the top of FIG. 1.

While, in the entire portion of the above mentioned part of the mold guide 200, that is in the portion thereof which in the direction indicated by the arrow 282 extends from the nozzle unit 280 shown in the upper part of FIG. 1 to the end of the branch of the mold guide 200 shown at the bottom of FIG. 1, the grooves 236, 238 and 240 are mutually parallel, the three grooves extend in the branch of the mold guide 200 shown at the top of FIG. 1 over the section thereof immediately before the nozzle unit 280 shown at the top of FIG. 1, in the manner shown in FIG. 4, which shows an inside view of the inner wall 202.

In the mold guide section in question the upper guide groove 236 has an obliquely upwardly extending portion 302 leading to an upper groove portion 304. The groove 238 extends unaltered horizontally for the whole of the mold guide section in question, and in the first portion of the same also the lowermost groove 240 extends unaltered horizontally. When, therefore, the mold moves through the mold guide portion with the oblique groove portion 302, the matrix part 208 of the mold 206 will be displaced upwards away from the intermediate part 212 as appears from the second mold 206 from the left in FIG. 4. Since the molded article 306 will jam to the core it will during the said movement of the matrix part 208 be pulled out of the mold cavity 210. Thereafter there is a section where the portion 304 of the groove 236 continues horizontally, while the groove 240 has an obliquely downwardly extending part 308 continuing into a horizontally extending lower part 310. When the mold 206 passes said distance its lower part 216 will be pulled away from the intermediate part 212 so that the core 218 is pulled out of the article 306. The latter will thereafter rest freely on the intermediate part 212. Opposite the space formed between the matrix part 208 and the intermediate part 212 the side wall 202 is at the last mentioned section provided with an outlet 312 for compressed air through which compressed air is conducted in between the matrix part 208 and the intermediate part 212. In the other wall 204, not shown, there is a corresponding opening through which the article can be ejected.

The said section is now followed by a section where the groove 240 has an obliquely upwardly extending part 316, and the groove 236 an obliquely downwardly extending part 318 continuing into the normal extension of the associating grooves 236 and 240. When passing this section the mold 206 will thus again be closed so that it is ready for a new molding operation when it again arrives at the aforesaid start position opposite the nozzle unit 280 now present there.

It should be mentioned that all the parts through which the liquid plastic material mass is to flow, for example the pump 30, the plate 26 and the nozzle units 280 ought to be enclosed by or contain heating jackets or other heating members in such a manner that it is ensured that while present in said members the plastic mass is kept liquid.

When as in the described embodiment the molding unit 10 has twelve nozzle units 280, and when it is supposed that the number of molds 206 in the mold conveyor can be divided by two, three, four, six and/or twelve, the molds need not be designed for molding of uniform articles, but it is possible by means of the machine to mold up to twelve different articles or still more if each mold is arranged for the molding of two or more different articles. If it is desired to mold equally many articles of each kind, it is possible by means of the machine to mold two, three, four, six or twelve different articles respectively. Said articles need not even have the same weight, since that under the said conditions it will always be the same nozzle members 280 that engage each separate mold, and as mentioned above each nozzle member can be adjusted to supply different amounts of molding mass by each molding operation, the adjustment taking place by the bush 114 being by means of the handle 116 screwed inwards or outwards in the upper cylinder 98. Simultaneously with the adjusting of the main cyclinder 40 also the auxiliary cylinder 64 must be means of the bush 76 with the handle 78 be adjusted correspondingly.

Moreover, the pump 30 shown may be replaced by two, three, four, six, or twelve pumps connected to individual or individual sets of nozzle members 280 so that it becomes possible at the same time to mold different molding masses, for example a molding mass of the same kind but with different colours, or even molding masses having different properties, the last said possibility, however, only when the different molding masses require the same cooling temperature.

Consequently the invention is not limited to the illustrated embodiment which within the scope of the invention can be altered in many further ways. Thus, the molding unit may have both more and fewer nozzle units 280, and the molds may, as mentioned several times before, be constructed for molding of more than one article at a time, however, preferably only a small number of articles, e.g. up to four.

The injection molding machine may, however, also be used for masses other than plastic materials, e.g. cosmetic masses which in their liquid state have a substantially smaller viscosity than liquid plastic material, and in connection with the molding of such masses the auxiliary cylinder 64 may be dispensed with.

I claim:

1. In an injection molding machine for nonmetallic compounds, the combination comprising a frame, a nozzle supporting member arranged in said frame rotatably around an axis of rotation, driving means for rotating said nozzle supporting member, a number of equally spaced injection nozzles arranged on said nozzle supporting member along a circle line concentric with said axis of rotation, an injection pump for each said injection nozzle arranged on said nozzle supporting member and having acting periods for delivering said compound alternating with filling periods and being adapted during each said acting period to communicate with the appertaining one of said injection nozzles, compound feeding means connected to said nozzle supporting member and adapted to be continuously driven for delivering said compound under pressure, each said injection pump being adapted to communicate with said feeding means during each said filling period, an endless mold conveyor comprising a number of molds each provided with a mold inlet, a mold quide support arranged in said frame and including a portion following an arc of a circle concentric with said axis of rotation opposite said circle line, each said nozzle, when opposite said mold quide support facing the same, a conveyor guide arranged outside said nozzle support member at a distance therefrom, said mold conveyor being guided by said mold guide support and said conveyor guide to follow a closed path having a first path portion following an arc of a circle concentric with said axis of rotation opposite said circle line and a second path portion outside said mold guide support, said mold guide support supporting each one of said molds of said mold conveyor at any time said mold follows said first path portion, thereby positioning said mold between said mold guide support and said nozzle supporting member opposite one of said nozzles, means for moving said mold conveyor with a speed equal to the rotary speed of said nozzles, displacing means arranged when each said nozzle is in a position opposite one of said mold inlets to provide a mutual displacement between said nozzle and said mold to ensure engagement of said nozzle with said mold inlet of said mold, injection actuating means adapted to actuate each said injection pump when the appertaining one of said nozzles engages one of said mold inlets to provide said acting period of said injection pump, each said mold including two mold parts adapted to be moved away from each other to provide an open mold and towards each other to provide a closed mold, closing means arranged along said first path portion and between the latter and said second path portion and adapted to maintain said mold in closed position, opening means arranged at said second path portion and adapted to open said molds, ejector means arranged at said second path portion and adapted to eject articles molded in said mold therefrom, closing means arranged at said path between said second path portion and said first path portion and adapted to provide closing of said molds, wherein there is an auxiliary feed pump for each said injection pump arranged on said nozzle supporting member, first communication means adapted to provide communication between said auxiliary feed pump and said injection pump, second communication means adapted to provide communication between said auxiliary feed pump and said feeding means, said feed pump having feed active periods alternating with intake periods, feed actuating means adapted to actute said auxilitary feed pump for delivering compound during said filling periods of said injection pump, said first comunication means comprising first valve means adatped to open said first comunication means during each said feed active period, said second communication means comprising second valve means adapted to close said second communication means during said feed active periods.

2. An injection molding machine as defined in claim 1, wherein each said injection pump has a first delivering capacity, the appertaining one of each said feed pump having a second delivering capacity, said first and said second delivering capacity being of the same magnitude.

3. An injection molding machine as defined in claim 2, wherein said first delivering capacity as well as said second delivering capacity are adjustable.

4. An injection molding machine as defined in claim 1, wherein said second communicating means include a connecting passage communicating with said feeding means as well as with said auxiliary feed pump, said second valve means including a nonreturn valve arranged in said connecting passage.

5. In an injection molding machine for non-metallic compounds, the combination comprising a frame, a nozzle supporting member arranged in said frame rotatably around an axis of rotation, driving means for rotating said nozzle supporting member, a number of equally spaced injection nozzles arranged on said nozzle supporting member along a circle line concentric with said axis of rotation, an injection pump for each said injection nozzle arranged on said nozzle supporting member and having acting periods for delivering said compound alternating with filling periods and being adapted during each said acting period to communicate with the appertaining one of said injection nozzles, compound feeding means connected to said nozzle supporting member and adapted to be continuously driven for delivering said compound under pressure, each said injection pump being adapted to communicate with said feeding means during each said filling period, an endless mold conveyor comprising a number of molds each provided with a mold inlet, a mold guide support arranged in said frame and including a portion following an arc of a circle concentric with said axis of rotation opposite said circle line, each said nozzle, when opposite said mold guide support facing the same, a conveyor guide arranged outside said nozzle support member at a distance therefrom, said mold conveyor being guided by said mold guide support and said conveyor guide to follow a closed path having a first path portion following an arc of a circle concentric with said axis of rotation opposite said circle line, and a second path portion outside said mold guide support, said mold guide support supporting each one of said molds of said mold conveyor at any time said mold follows said first path portion, thereby positioning said mold between said mold guide support and said nozzle supporting member opposite one of said nozzles, means for moving said mold conveyor with a speed equal to the rotary speed of said nozzles, displacing means arranged when each said nozzle is in a position opposite one of said mold inlets to provide a mutual displacement between said nozzle and said mold to ensure engagement of said nozzle with said mold inlet of said mold, injection actuating means adapted to actuate each said injection pump when the appertaining one of said nozzles engages one of said mold inlets to provide said acting period of said injection pump, each said mold including two mold parts adapted to be moved away from each other to provide an open mold and towards each other to provide a closed mold, closing means arranged along said first path portion and between the latter and said second path portion and adapted to maintain said mold in closed position, opening means arranged at said second path portion and adapted to open said molds, ejector means arranged at said second path portion and adapted to eject articles molded in said mold therefrom, closing means arranged at said path between said second path portion and said first path portion and adapted to provide closing of said molds, wherein each said mold includes besides said two mold parts a third mold part, one of said three mold parts being a matrix part provided with said mold inlet, the further two of said three parts being an intermediate part and a lower part respectively, said three mold parts being movable towards and from each other and being provided with mold guide means guiding the said three parts relative to each other, each said mold part being provided at each side thereof with an outwards projecting guide stud, a form part guide being arranged at said path and being a form part guide member arranged at each side of said path, each said form part guide member including a closing section arranged between said second path portion and said first path portion, an active section arranged along said first path portion and between said first path portion and said second path portion and continuing into an opening section at said second path portion, each said form part guide including a first guide means adapted to cooperate with one of said guide studs of said matrix part, a second guide means adapted to cooperate with one of said guide studs of said intermediate part, and a third guide means adatped to cooperate with one of said guide studs of said lower part, said guide means in said active section having constant mutual distances ensuring maintaining of said mold in closed position, said opening portion including a matrix mold part rising part, a lower mold part lowering part and a final part, said first and second guide means in said matrix mold part rising part having increasing mutual distance, said third guide means and said second guide means in said lower part lowering part having increasing mutual distance, said three guide means having in said final part constant mutual distance ensuring maintaining of said mold in open position, said first, second and third guide means in said closing section having decreasing mutual distances ensuring closing of said mold, said ejector means being arranged at said final part of said opening section.

6. An injection molding device as defined in claim 5, wherein said injector means includes an air outlet for compressed air arranged in the one of said two form part guide members and a narticle outlet arranged in the other one of said two form part guide members opposite said air outlet.

References Cited

UNITED STATES PATENTS

| | | | |
|---|---|---|---|
| 2,679,660 | 6/1954 | Bain | 18—30 X |
| 2,724,860 | 11/1955 | Strong | 18—30 X |
| 3,078,517 | 2/1963 | Makowski | 18—30 X |
| 3,095,609 | 2/1963 | Liruyr | 18—30 |
| 3,164,863 | 1/1965 | Hunt | 18—30 X |
| 2,974,361 | 3/1961 | Gercke et al. | 18—4 |
| 3,262,150 | 7/1966 | Morin | 18—4 |

FOREIGN PATENTS

| | | |
|---|---|---|
| 1,347,832 | 11/1963 | France. |
| 587,311 | 1/1959 | Italy. |

WILLIAM J. STEPHENSON, *Primary Examiner*.